(12) United States Patent
Dynarski et al.

(10) Patent No.: US 6,628,671 B1
(45) Date of Patent: Sep. 30, 2003

(54) INSTANT ACTIVATION OF POINT-TO POINT PROTOCOL (PPP) CONNECTION USING EXISTING PPP STATE

(75) Inventors: Richard J. Dynarski, Glen Ellyn, IL (US); Matthew Harper, Arlington Heights, IL (US); Andrew Bezaitis, Chicago, IL (US); Yingchun Xu, Buffalo Grove, IL (US); Kenneth L. Peirce, Jr., Barrington, IL (US)

(73) Assignee: VTStarcom, Inc., Alameda, CA (US)

( * ) Notice: Subject to any disclaimer, the term of this patent is extended or adjusted under 35 U.S.C. 154(b) by 0 days.

(21) Appl. No.: 09/233,382

(22) Filed: Jan. 19, 1999

(51) Int. Cl.[7] .............................. H04J 3/22; H04L 12/56
(52) U.S. Cl. ....................................... 370/469; 370/389
(58) Field of Search ................................ 370/466, 467, 370/469, 389, 395.5, 395.52, 401

(56) References Cited

U.S. PATENT DOCUMENTS

| | | | |
|---|---|---|---|
| 5,325,419 A | | 6/1994 | Connolly et al. |
| 5,438,614 A | | 8/1995 | Rozman et al. |
| 5,528,595 A | | 6/1996 | Walsh et al. |
| 5,717,690 A | * | 2/1998 | Peirce, Jr. et al. .......... 370/389 |
| 5,850,517 A | | 12/1998 | Verkler et al. ......... 395/200.32 |
| 6,021,495 A | * | 2/2000 | Jain et al. .................... 713/201 |
| 6,400,712 B1 | * | 6/2002 | Phillips ...................... 370/355 |
| 6,421,714 B1 | * | 7/2002 | Rai et al. .................... 709/217 |

FOREIGN PATENT DOCUMENTS

| | | |
|---|---|---|
| WO | WO9641434 | 12/1996 |
| WO | WO 9840988 | 9/1998 |
| WO | WO9901969 | 1/1999 |

OTHER PUBLICATIONS

PCT International Search Report for 3 Com Corporation et al, PCT/US/ 99/28016, dated Nov. 23, 1999.

International Preliminary Examination Report for 3Com Corporation, et al., in PCT/US99/28016, dated Nov. 16, 2000.

Request for Comments (RFC) 2002, C. Perkins, editor, (Oct. 1996).

* cited by examiner

*Primary Examiner*—Alpus H. Hsu
*Assistant Examiner*—Toan Nguyen
(74) *Attorney, Agent, or Firm*—McDonnell Boehnen Hulbert & Berghoff

(57) ABSTRACT

A network access server providing remote access to an IP network for a remote client initiates a PPP connection for a remote client quickly, and without requiring re-negotiation of Link Control Protocols and Network Control Protocols. The network access server has a PPP session with the remote client go dormant, for example when the user is a wireless user and goes out of range of a radio tower and associated base station. The network access server does not get rid of the PPP state for the dormant session, but rather switches that PPP state to a new session, such as when the client moves into range of a different radio tower and associated base station and initiates a new active session on the interface to the wireless network. The switching of PPP states may be within a single network access server, or from one network access server to another. This "context switching" of the active PPP session allows the mobile user to seamlessly move about the wireless network without having to re-negotiate Link Control Protocols and Network Control Protocols every time they move out of range of one radio tower and into range of another radio tower.

11 Claims, 6 Drawing Sheets

IWU = nMCP CARD SETS 50/52+ MARC CARD SET 58/60

INSTANT ACTIVATION OF POINT-TO POINT PROTOCOL (PPP) CONNECTION USING EXISTING PPP STATE

BACKGROUND OF THE INVENTION

A. Field of the Invention

This invention relates to the field of Point-to-Point Protocol (PPP) and Internet Protocol (IP) data networking. More particularly, the invention relates to a process by which a communications device, for example, a laptop computer equipped with a cellular telephone modem, activates a Point-to-Point Protocol (PPP) connection to a Internet Protocol (IP) packet switched network, such as a Ethernet LAN or the Internet, via a network access server. The invention is applicable to other types of PPP links besides a wireless PPP link.

B. Description of Related Art

Wireless communications networks offer much flexibility to the user, in that they allow users of portable communications devices, such as personal digital assistants, laptop computers, telephones, and other appliances to get connected to the public switched telephone network from any location within the region served by the wireless network. Connolly et al., U.S. Pat. No. 5,325,419, discloses a personal communication system by which a mobile device uses an RF link to a communicate with an intelligent base station. The intelligent base station provides radio access along with an Integrated Services Digital Network (ISDN) interface to the public switched telephone network. The PSTN aspect of the system has three components: a personal communications switching center, where telephone central office switches have certain characteristics, a signaling transfer point, and a service control point where an intelligent data base exists maintaining certain user features and records.

The patent application of Yingchun Xu, et al., Ser. No. 08/887,313, now U.S. Pat. No. 6,151,628, which is assigned to the assignee of the present invention and which is fully incorporated by reference herein, describes a system by which a wireless communications device such as a laptop computer may access a packet-switched (e.g., IP) data network such as a corporate backbone network or the Internet. In the Xu et al. system, a frame relay line connected to the wireless network base station couples the remote wireless user to the packet-switched network via an all-digital network access server. This type of network access server can be configured as an InterWorking Unit (IWU) and the two terms are occasionally used interchangeably herein. The network access server provides an interface to the frame relay line and a base station and central base station controller in the wireless network, and an interface (including router functionality) to the packet switched IP network. The Xu et al. application further discloses certain accounting and routing techniques that permit network access to authorized users, while at the same time providing convenient authorization and accounting techniques to be performed by the entity operating the network access server. Network access servers suitable for use as an IWU platform are, per se, known in the art and commercially available from companies such as 3Com Corporation. They are also described in the patent literature. See, e.g., the patent awarded to Dale M. Walsh et al., U.S. Pat. No. 5,528,595, incorporated by reference herein.

In the prior art, every time a call is initiated over a PPP link (such as a call initiated by a remote terminal over the public switched telephone network, over a wireless network, or over some other circuit switched network to a network access server), part of the connection process involves the negotiation of certain protocols with the PPP, such as the Link Control Protocol (LCP), and Network Control Protocols (NCP). Such protocols negotiations are necessary so as to insure that both the remote terminal and the modems or other elements in the network access server are configured in a compatible manner. The many exchanges of parameters during the negotiations and subsequent data transfers contribute to establish a "state" for the PPP protocols to operate within. These protocol negotiations, particularly at the time a PPP link is established, can become time consuming, relatively speaking.

The known prior art has failed to recognize that if a PPP session for a user goes dormant and the user then connects to a different IWU (or to a different port in the same IWU), that the PPP negotiated parameters and the state for a call which is currently going dormant can be used to make the new PPP connection, without repeating the lengthy PPP negotiations. An example of how a PPP session may go dormant is when a mobile wireless communications device moves out of range of a first base station and the call is handed off to a second base station. When a new PPP circuit is established from the mobile device, via the new base station, to the network access server, the network access server/IWU would go through the PPP protocol negotiation procedure in accordance with the prior art approach. In our invention, however, the PPP state from the dormant PPP session (i.e., no active data transfer but the PPP session is still active) is switched over to the new, active PPP session, without requiring re-negotiation of the PPP parameters. Moreover, the switching of the PPP state can occur without the mobile communications device having to disconnect and reconnect it's PPP session. To the mobile unit, it is unaware that its calls have been handed off between base stations and between network access servers/IWUs. Thus, the invention can provide essentially continuous, uninterrupted access to the IP data network regardless of where the user may move within the wireless network.

The invention is especially useful in wireless networks where users with PPP connected mobile units will be continuously moving in and out of range of base stations. However, the same concepts work in any network which provides the ability to connect devices together via the PPP. For example, if a user dials up via the Public Switched Telephone Network (PSTN) and establishes a PPP link with a device such as a network access server, the session goes dormant, and then dials into a different port in the network access server, the PPP state from the dormant session can be used in the new session without the user having to renegotiate the PPP protocols.

An object of the invention is to provide a method to allow a PPP session to go dormant and then dial back into a different port on the same network access server without needing to go through the standard LCP and NCP negotiations to bring the new PPP session active.

In accordance with another feature of the invention, a method is provided to allow a PPP session to go dormant, and then the user dials back into a different port on a different network access server without requiring the user to clean up the previous PPP session on the original network access server.

In accordance with another feature of the invention, a method is provided which allows for call cost accounting for the user during active call periods, as well as during dormant call periods.

These, and other, features and advantages of the invention will be appreciated from the following detailed description of a presently preferred embodiment of the invention.

SUMMARY OF THE INVENTION

A method is provided for connecting a communications device to a packet switched network. The nature of the communications device is unimportant, and could be a personal computer, personal digital assistant, laptop computer with a cellular telephone modem, telephone, or otherwise. The method provides for the step of first initiating a Point-to-Point Protocol (PPP) session between the device and a network access server. The network access server provides access to the packet switched network for the device. The particular medium in which the PPP session is established is not critical. The example of a wireless medium described herein is only one possible example. The session is associated with a PPP state and with a first port in the network access server. As some later point in time, the PPP session thereafter becomes dormant, but the PPP state is not removed from the network access server.

In a first embodiment of the invention, after the PPP session has become dormant, the network access server receives a new call set-up message associated with the communications device. The new call set-up message arrives at a second port in the network access server. In the wireless example, the user operating the lap-top computer moves out of range of one radio tower and into range of another tower, and a call set up message and PPP session is initiated between the new radio tower, base station and the new (second) port in the network access server.

Rather than re-negotiate the PPP protocols (LCP and NCP) for the new session, the PPP state is switched from the dormant PPP session associated with the first port to the session associated with the second port in the network access server. Thus, the PPP state is transferred to the PPP session associated with the new call set-up message and the negotiation of link control protocols or network control protocols between the device and the network access server may be avoided.

In one possible example, the first PPP session becomes dormant due to movement of the communications device relative to a first radio tower linking the device to a wireless communications network. The new call set-up message is initiated in response to the device coming within range of a second radio tower in the wireless communications network.

In one possible embodiment of the invention, the new call set-up message contains information uniquely identifying the device (such as an International Mobile System Identification number (IMSI) and/or Electronic Serial Number (ESN)). The method further comprises the steps of transmitting an access-request message containing this information from the network access server to an authorization server. The authorization server, for example a RADIUS authentication, authorization and accounting server, responsively issues an access-accept message to the network access server if the device is authorized to access the packet-switched network (e.g., the user of the device is a subscriber to the service, has paid its bills, etc.). The network access server then uses the information uniquely identifying the device to identify and find the dormant PPP session associated with the first port in the network access server. For example, the network access server may contain a general purpose computing engine and memory maintaining a table mapping ISMI/ESN numbers to a particular port, with the table indicating whether the particular port is active or dormant. In this fashion, the network access server can avoid re-negotiation of the PPP protocols and instead use the PPP state from the dormant session.

The invention can be used when a connection between the communications device and a second network access server is initiated, while a dormant PPP session exists for the device in the first network access server. In this example, a PPP session is initiated between the device and a first network access server. The first network access server provides access to the packet-switched network for the device. The session is associated with a PPP state and with a first port in the first network access server. The PPP session thereafter becomes dormant but the PPP state is not removed from the network access server.

Thereafter, a second network access server receives a new call set-up message containing information uniquely associated with the device. The new call set-up message arrives at a port in the second network access server. The second network access server transmits an access-request message to an authentication server. The access-request message contains the information uniquely identifying the device, such as the IMSI/ESN number for the device.

The authorization server responsively issues a message to the first network access server to initiate clearing of the dormant session from the first network access server. The first network access server transfers the PPP state for the mobile device to the second network access server. The authorization server further issues an access-accept message to the second network access server. The second network access server responsively enables the negotiation of protocols associated with the PPP, or, more preferably, uses the transfer of the existing PPP state from the first network access server and avoids the re-negotiation of the PPP protocols.

A method is also provided for accounting for wireless communication periods between a mobile communications device and a packet-switched network. The device is coupled to the packet-switched network via a network access server. The method involves tracking time periods in which a communications session between the device and the packet-switched network is dormant. In a preferred embodiment, the step of tracking comprises the step of periodically sending an update message from the network access server to an accounting server. The update message includes information uniquely identifying the device and information indicating the dormant status of the session. The accounting server (e.g., a RADIUS server) monitors the update messages and maintains a log of the amount of time that the session is dormant. Further, the accounting server (or other device in the system providing wireless access to the network) allocates a cost for the dormant time periods. In similar fashion, the accounting server keeps track of the time periods in which the sessions are active, and allocates a cost to the active time periods. The organization operating the network access server and providing wireless access to the network bills the user for both the dormant time periods and the active time periods.

BRIEF DESCRIPTION OF THE DRAWINGS

In the following description, reference will be made to the appended drawings, wherein like reference numbers refer to like elements in the various views, and in which.

DETAILED DESCRIPTION OF THE PREFERRED AND ALTERNATIVE EMBODIMENTS OF THE INVENTION

Figure 1:
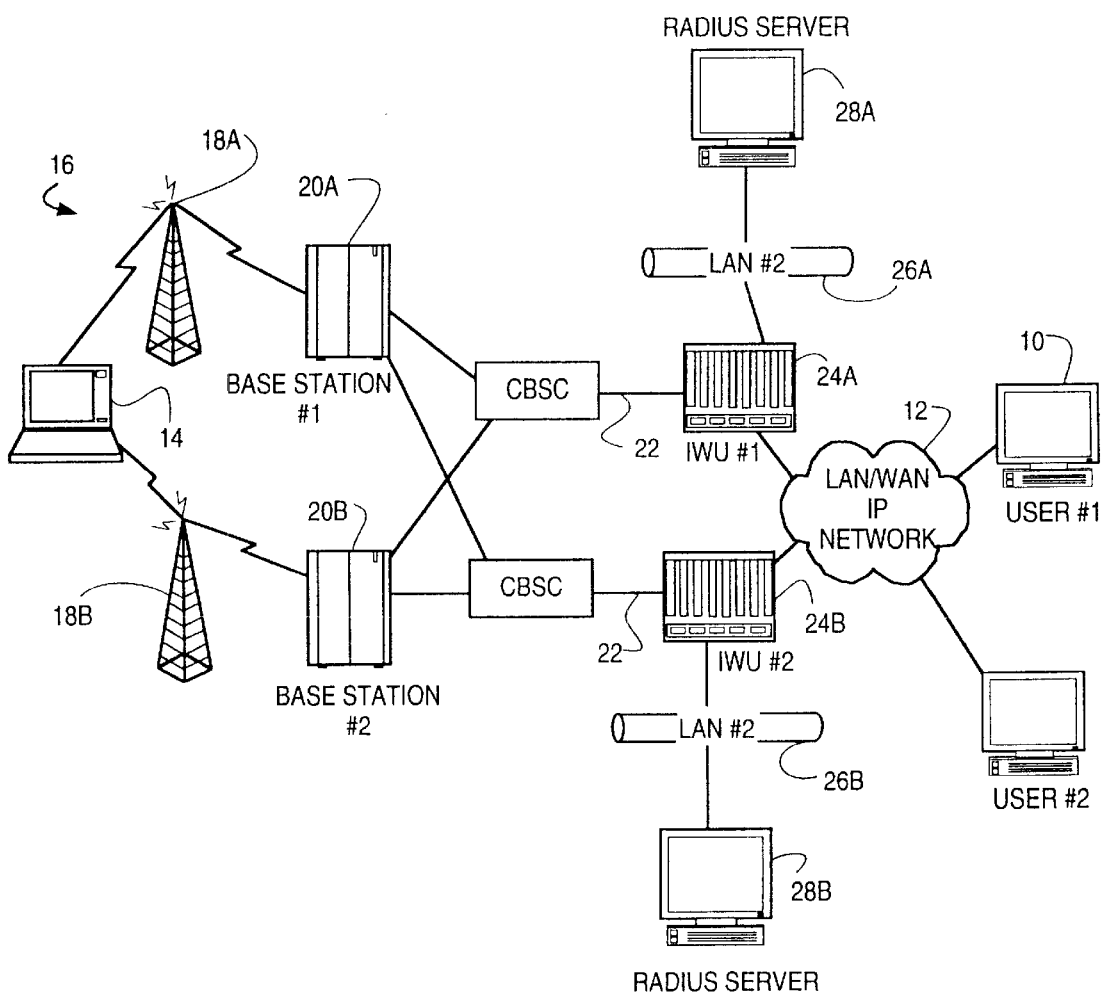
FIG. 1 is a schematic illustration of the communications architecture that may be used to link one or more remote terminals on a packet-switched network and a user operating a mobile wireless communications device such as a laptop computer equipped with a cellular telephone modem.

FIG. 1 is a schematic diagram showing the overall architecture and system by which a user, for example, a person operating personal computer 10 on a corporate backbone or wide area packet-switched network 12, may communicate with a person operating a mobile wireless communications device, such as a user operating laptop computer 14 having a wireless modem for use in a wireless network 16. The wireless network 16 includes one or more radio towers 18A and 18B providing an RF link to a wireless modem in the mobile communications device 14. Each radio tower 18A, 18B has its own base station 20A, 20B, respectively, in the network 16. The details on the wireless network 16 per se are conventional and known in the art. One example would be the personal communications system described in the above-cited Connolly et al., U.S. Pat. No. 5,325,419. Another example would be a conventional cellular telephone network.

The nature of the mobile wireless communications device 14. is not important. For purposes of illustration, a laptop computer with a wireless modem is shown in the drawings. However, it could easily be a personal digital assistant, a portable electronic cash register or credit card swipe with a wireless modem, a portable fax machine, or any other type of device or appliance that can be used to access a packet-switched IP network such as network 12 in order to communicate with a remote terminal such as general purpose computer 10. Of course, the details of the network 12 and remote terminal 10 are also not particularly important.

The base stations 20 are each coupled to a central base station controller (CBSC) via a multiplexed frame relay line 22 which carries data to and from a network access server or InterWorking Unit 24. The CBSC is maintained and operated by the provider of the wireless communication service for the mobile node. The CBSC multiplexes a plurality of calls (e.g., 23) onto an Integrated Services Digital Network Primary Rate Interface (ISDN PRI) T1 line and directs the data to the network access server 24. The CBSC also initiates a page of the mobile node using elements of the wireless network, such as a mobile switching center (not shown), base station 20 A and a radio tower 18A. The connection between the CBSC and the network access server 24 could also use some other technology such as Asynchronous Transfer Mode (ATM). In the embodiment of FIG. 1, both base stations have a frame relay interface that couples the base stations to two network access servers 24A and 24B.

In the illustrative embodiment of FIG. 1, the Point-to-Point Protocol (PPP) is the layer 2 (Data Link Layer) protocol that is used to connect the wireless unit 14 to the network access servers 24. Since it is a layer 2 protocol, it is dependent upon a layer 1 protocol to provide transport over any network. In a wireless network, the Reliable Link Protocol (RLP) is the protocol used between the mobile device 14 and the base stations 18A and 18B.

The base stations 20A and 20B are connected via Frame Relay interfaces to InterWorking Units 24 functioning as Internet Protocol (IP) network access servers. Wireless signaling procedures specify how to establish, remove and idle connections within the wireless network 16, that is, from the mobile device 14 to the InterWorking Unit side 24 of the Frame Relay connection over frame relay lines 22.

The network access servers 24A and 24B provide an interface to the frame relay line 22 and CBSCs. The network access servers 24 have one or more frame relay interface cards (described below) that demultiplex incoming channel data. The network access servers 24 also have one or more Mobile Call Processor (MCP) cards (described below) based on a RISC-based computing platform. The MCP cards forwards packets of digital data from the interface card to a packet bus for transmission to a network interface gateway/router card. The gateway card provides an interface to a packet-switched network such as LAN/WAN 12. In a preferred embodiment, the network access servers are of the type generally described in the above-cited Walsh et al. '595 patent, with the telephone line interfaces modified as necessary to accommodate frame relay lines for transmitting data to and from a wireless communications system indicated generally by reference number 16. Furthermore, since the system is all-digital, modems per se are not needed and the modem cards of the '595 patent can be replaced with a MCP cards as described in further detail below.

Additionally, each network access server 24A and 24B is located on a IP local area network 26A and 26B, respectively. The local area networks 26 include, among other things, an authentication server 28. The authentication server 28, in a preferred embodiment, comprises a general purpose computer functioning as a RADIUS server (a known device) providing accounting, authorization and authentication functions for a plurality of mobile users. Further details on functions performed by the RADIUS server are either known in the art or will be described in more detail below.

With the above overview of FIG. 1 in mind, a method is provided for connecting the mobile wireless communications device 14 to a packet switched network 12 in which a dormant PPP session between the mobile device 14 and a network access server can be used to quickly activate a new PPP session. When the device 14 first dials into the network access server 24A, it initiates a PPP session between the device and the network access server 24A and negotiates components of the PPP, e.g., NCP and LCP protocols. The network access server 24A provides access to the IP packet-switched network 12 and allows the device 14 to communicate with the remote terminal 10. The PPP session between the device 14 and the network access server 24 is associated with a PPP state in the network access server. At some point, e.g., when the device 14 goes out of range of base station 18A, the PPP session thereafter becomes dormant but the PPP state is not removed from the network access server 24A. Again, the PPP state is a set of parameters that include negotiated PPP protocols, the options in use, as well as certain variables that change as the connection exchanges data and PPP control packets. The PPP state for any particular link is a software structure stored in both a gateway or routing card in the network access server 24A that implements the PPP protocol stack, and in the wireless device.

An example of how the first PPP session can go dormant is when the device 14 leaves the range of radio tower 18A (resulting in the PPP session between device 14, radio tower 18A and network access server 24A going dormant). Specifically, when the mobile device 14 goes out of range of the tower 18A the base station 20A signals, using wireless call signaling procedures, to the network access server 24A that the call is going dormant. The network access server 24A signals the PPP component (a software module and the PPP stack in the router or gateway card in the network access server 24A) that the call has gone dormant and the PPP component marks the PPP session as dormant and does not remove its state.

When the device comes into range of radio tower 18B, a new PPP link is established between the device 14, tower 18B and a second port in the network access server 24A in accordance with a preferred embodiment of this invention. More particularly, the base station 20B sends a new call set-up message associated with the device 14 to the network access server 24A via frame relay line 22, where it is received at a second port in the network access server 24A. Rather than renegotiate the PPP, LCP and NCP protocols, the present invention takes advantage of the fact that the PPP state for the dormant session can be switched to the new session associated with new call set-up message received at the second port. The PPP state, already established and still existing in the network access server 24A, is transferred to the session associated with the new call set-up message and the negotiation of link control protocols or network control protocols between the device 14 and network access server 24A may be avoided.

As noted above, in the illustrated embodiment the first session becomes dormant due to movement of the device 14 relative to a first radio tower 18A, and the new call set-up message is initiated in response to the device 14A coming within range of a second radio tower 18B in the wireless communications network 16.

In a preferred embodiment, the new call set-up message contains information uniquely identifying the device 14, such as the device's IMSI/ESN number. The method further comprises the steps of transmitting an access-request message containing this information from the network access server 24A to its associated authorization server, such as RADIUS server 28A. The RADIUS server detects that this mobile device 14 is going from dormant to active state because the device's IMSI/ESN has already been allocated an IP address by the RADIUS server 28 (e.g., when the first PPP session was initiated). The RADIUS server 28 responsively issues an access-accept message to the network access server 24A in the event that the device 14 is authorized to access the network. Further, the network access server uses the information uniquely identifying the device 14 to identify and find the dormant PPP session associated with the first port in the network access server. For example, the RADIUS server 28A returns an access-accept message with a RADIUS attribute which contains the IMSI/ESN number. That number can be used in the network access server 24A to find the dormant PPP session (such as by the network access server 24A maintaining a table mapping IMSI/ESN numbers to PPP sessions).

The network access server 24A then "context switches" the PPP state from the dormant Point-to-Point Frame Relay interface to the active Frame Relay Point-to-Point interface. The PPP module that is controlling the newly-opened connection has its PPP "state" variables populated with copies of those variables in the dormant PPP session.

After the PPP state has been switched to the active Frame Relay interface (associated with the second port), the network access server 24A then responds to the base station 20B with a connect message which brings the RLP/Frame Relay link active so that the mobile device 14 can use the new layer 1 connection. This all happens without the original PPP session or the mobile device 14 having to disconnect and then reconnect its PPP session. The process is transparent to the mobile device, and the user is unaware that its call has been handled off between base stations.

The "context switching" in multiple different network access servers/InterWorking Units is as follows. Still referring to FIG. 1, a PPP session is initiated between the mobile device 14 and a first network access server 24A. The PPP session thereafter becomes dormant (e.g., the device 14 moved out of range of the radio tower 18A), but the PPP state is not removed from the network access server. The network access server 24A signals the PPP component that the call has gone DORMANT and the PPP component marks the PPP session as DORMANT and does not remove its state.

When the device comes into range of the new tower 18B, the base station 20B sends a new call set-up message to the new network access server 24B, containing information uniquely associated with the device 14, such as the device's IMSI/ESN number. The new call set-up message is assigned to a certain port in the second network access server 24B.

The second network access server 24B transmits an access-request message to its associated authentication server e.g., RADIUS server 28B. The access-request message contains the information uniquely identifying the device (received in the call set-up message from the base station 20B). The RADIUS server 28B responsively issues a RESOURCE-RECLAIM message to the first network access 24A server to initiate clearing of the dormant session from the first network access server 24A. The radius server 28B will know that the first network access server 24A has a dormant session for the device by virtue of the fact that the Radius Server may be implemented in the same device or chassis as the network access server 24A, or a discovery packet could be sent by the network access server 24A to a group of applicable RADIUS servers. Alternatively, the RADIUS server could know that there is a dormant PPP session in the network access server 24A since it issued an IP address for the mobile device 14 to the network access server 24A.

The RESOURCE__RECLAIM message allows the IP/IPX routers in network 12 to clear out their routes for the dormant IP address. To accomplish this, the RADIUS server 28B should either be on the same local area network as the network access server 24A or be able to route packets there over the LAN/WAN 12. The RADIUS server 28B also issues an access-accept message to the second network access server 24B with the IMSI/ESN number for the device 14 in RADIUS attributes, along with the PPP state variables for the dormant session. The second network access server responsively accepts the PPP state information that accompanies this ACCESS__ACCEPT message and inserts them into the PPP module in its router or gateway card. The process takes approximately 10 milliseconds. This allows for essentially instant activation of the PPP session in the second network access server, all transparent to the user.

It can be seen from the preceding description that we have provided an improvement to a wireless communications system comprising a plurality of radio towers 18A and 18B transmitting and receiving data to and from a plurality of mobile wireless communications devices (e.g., 14), a plurality of base stations 20A and 20B linking the radio towers to a high speed digital network (frame relay lines 22), and at least one network access server 24A coupled to the high speed digital network 22. The network access server 24A provides access for the device 14 to an IP packet-switched network, e.g., LAN or WAN 12. The improvement comprises an authentication server 28A coupled to the network access server 24A over a local or wide area network 26. The authentication server 28A contains a suitable software program for processing an access-request message from the network access server 24A when the mobile wireless communications device 14 moves out of range from radio tower 18A into range of radio tower 18B. The access-request message contains information uniquely identifying the device, such as its IMSI/ESN number.

The authentication server determines from the information uniquely identifying the device that this mobile device 14 is going from a dormant to an active state. Specifically, the RADIUS server determines whether an Internet Protocol (IP) address has been allocated to the device (for example, because an IP address was assigned to the the device when it set up its PPP session on one of the ports of the network access server 24A, such session later becoming dormant). The authentication server 28A responsively issues to the network access server 24A an access-accept message containing the IMSI/ESN number indicating that an IP address has been allocated to the device 14. The network access server 24A uses that information to find the dormant PPP session, and switches the PPP state associated with the dormant PPP session to the session associated with the access-request message. Thus, the PPP state may be transferred to the new session and the negotiation of link control protocols or network control protocols between the device 14 and the network access server 24A may be avoided. A similar process can be used for transferring an active PPP state among different network access servers, as described above.

Furthermore, since the RADIUS server 28A is monitoring sessions in which the calls are both active and dormant, it is possible to account for wireless communication periods between a mobile communications device 14 and a packet-switched network 12. The RADIUS server 28A tracks time periods in which the communications session between the device and the network access server 24A is dormant. This can be performed by periodically sending an update message from the network access server 24A to the RADIUS server 28A. The update message includes information uniquely identifying the device and information indicating the dormant status of the session. The RADIUS server (or otherwise by the provider of the service) allocates a cost for the dormant session, such as by minute. Similarly, the RADIUS server tracks time periods in which a communication session between the device 14 and the network access server is active, and allocates a cost for the active time periods. On a regular basis, e.g., once per month, the user operating the device 14 is billed for both the active and the dormant time periods.

Further details on a presently preferred implementation of the invention in an Interworking Unit (IWU) functioning as a network access server will now be described in conjunction with FIGS. 2–6.

Figure 2:
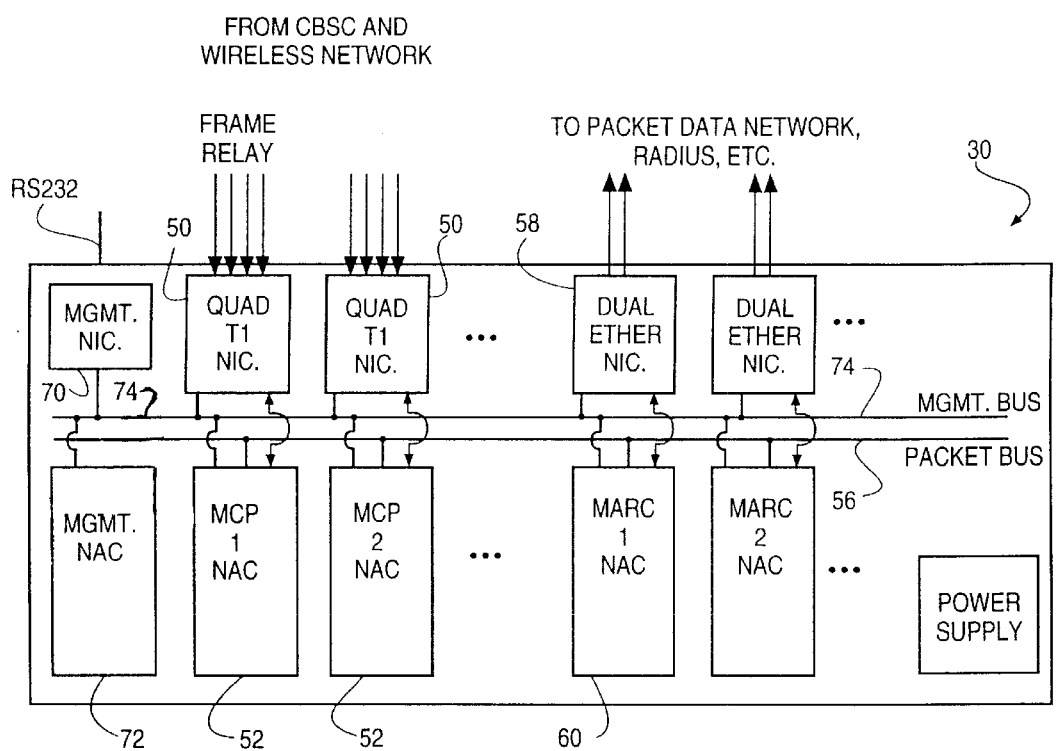
FIG. 2 is a block diagram of a network access server of FIG. 1 in which multiple InterWorking Units (IWU) are implemented within a single chassis.

FIG. 2 is a block diagram of a network access server 24 of FIG. 1 in which multiple InterWorking Units (IWU) are implemented within a single chassis. The network access server 24 is a high-density system, in that potentially hundreds of calls could be routed through the chassis at the same time. To accomplish this, the chassis consists of a plurality of frame relay line network interface cards 50. Each card 50 is configured to receive four T1 digital telephone lines, comprising twenty four time division multiplexed channels. The 96 channels are demultiplexed in the cards 50 and supplied to an associated Mobile Call Processor (MCP) card 52. The development of circuitry for the Quad T1 NIC cards 50 is within the ability of persons skilled in the art in view of the patent literature (see the above-referenced Walsh et al. '595 patent) or in view of analogous cards present in commercially available network access servers.

The mobile call processor cards 52 basically comprise a RISC-based computing platform that receives the demultiplexed data from the quad T1 NIC, and hands the data in packet form over to low level drivers that place the data on a 32-bit parallel packet bus 56. The packet bus 56 runs down the length of the chassis 24 and provides a means for communication between the various modules in the chassis. The computing platform in the MCP cards may also perform limited PPP co-processing in the manner described in the published European Patent Application of Daniel L. Schoo et al., publication number EP 0 878 070, which is incorporated by reference herein.

The packet data from the wireless network is transmitted along the packet bus 56 to a gateway interface module comprising a dual ethernet network interface card 58 and a Mobile Access Routing Card (MARC) card 60. The MARC card 60 is of the same basic design of the gateway card described in the above-referenced Walsh et al. '595 patent, in that it implements routing code and the associated protocol stacks in order to provide the necessary interfaces to the IAN/WAN IP packet switched data network. Router cards suitable for use as the platform for the MARC cards 60 are also commercially available from companies such as 3Com Corporation in its HiperARC™ routing card and Edgeserver™ card. Equivalent cards are also available from other companies in the industry, including Ascend Communications, Cisco Systems, and Lucent Technologies (successor to Livingston Enterprises, Inc.).

Figure 3:
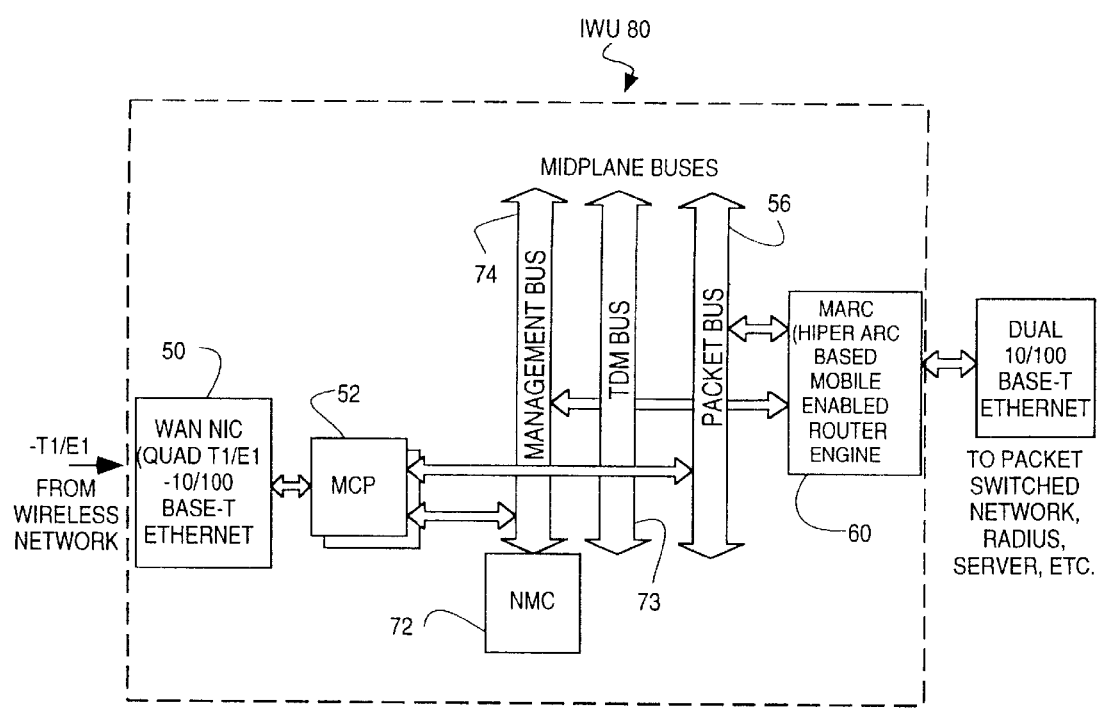
FIG. 3 is a block diagram of the modules and communications elements in the network access server of FIG. 2 that cooperate to perform the function of a single IWU.
Figure 6:
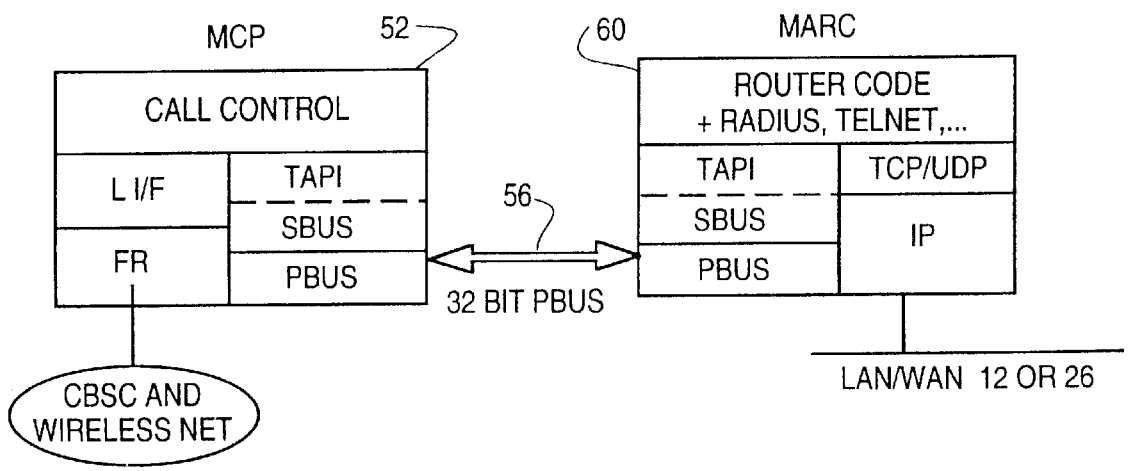
FIG. 6 is an illustration of the protocol architecture that is used for communications between the MCP card of FIG. 2 and the Mobile Access Router Card (MARC) of FIGS. 2 and 3.

FIG. 6 is an illustration of the protocol architecture that is used for communications between the MCP card of FIG. 2 and the Mobile Access Router Card (MARC) of FIGS. 2 and 3.

In the embodiment of FIG. 2, one set of cards 58 and 60 can support a number of different Quad T1 NIC/MCP card sets 50/52, in that the MARC cards 60 are high capacity cards capable of handling several hundred calls at once. The term IWU, as used herein, is intended to encompass the functionality of a card or device that performs the demultiplexing of the incoming channel data from the frame relay interface, a call processing module, and a gateway interface. It is thus apparent that multiple IWUs can be implemented in a single chassis, such as shown in the embodiment of FIG. 2 in which multiple quad T1 NIC/MCP cards sets and multiple dual ethernet NIC and MARC cards sets are installed in the same chassis.

The chassis of FIG. 2 further includes a management card set 70 and 72 and a management bus 74. The details of these elements are not particularly pertinent to the present invention and thus are omitted. The interested reader is directed to the patent U.S. Pat. No. 5,438,614 to Christopher Rozman et al. for further details on a management system for a network access server.

FIG. 3 is a block diagram of the modules and communications elements in the network access server that cooperate to perform the function of a single IWU 80. The IWU 80 consists of a wide are network interface card 50 providing the interface to the frame relay/T1 line connected to the wireless network, a mobile call processing card 52, and a packet bus 56 coupling the mobile call processing card 52 to the MARC card 60. The network management card 72 and network management bus 74 are optional. Further, while the midplane bus complex includes a time division multiplexed (TDM) bus 73, it is also optional and not necessary or even used in the IWU architecture of FIGS. 2 and 3.

Figure 4:
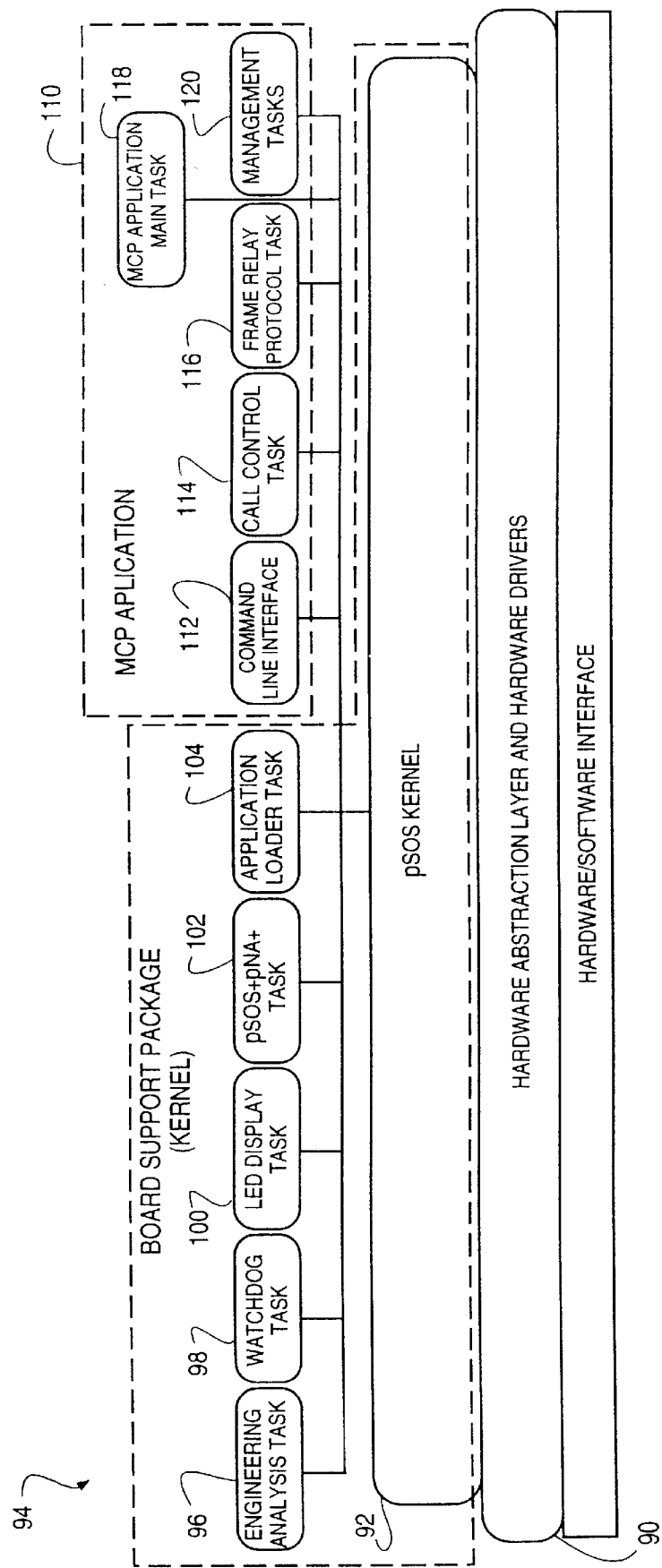
FIG. 4 is a diagram of the application software architecture for the mobile call processor (MCP) card of FIGS. 2 and 3.

Referring now to FIG. 4, the software architecture of the mobile call processor card 52 is shown. Generally, the software and firmware running in the card includes the following layers: a hardware abstraction layer and device drivers 90, a multi-tasking real time operating system (pSOS+) 92, a board support package 94 comprising an engineering analysis task 96, a watchdog task 98, an LED display task 100, a pSOS+pNA+ task 102, and an application loader task 104. The software further includes an application layer 110, having a command line interface task 112, a call control task 114, a frame relay protocol task 116, an MCP application main task 118, and a management task 120.

Hardware Abstraction Layer and Device Drivers 90

Much of the hardware abstraction layer of the software is resident in a BIOS ROM module in the MCP card. This layer includes the software components that are responsible for initializing the hardware, setting up DRAM, initializing the basic software structures such as the stack and heap, performing general functions such as memory allocation, and accessing peripheral devices.

pSOS+ 92

This layer is composed of the real-time operating system being used for the MARC and MCP cards. It provides low-latency interrupt and context switching (as described in detail above), task creation and deletion, multitasking, and timer support. For additional information on the pSOS+ operating system, refer to the *pSOSystem Getting Started Manual, pSOSystem Concepts Manual, the pSOSystem User Manuals*, and the *pSOSystem Reference Guide*, available from Integrated Systems, Inc., 201 Moffett Park Drive, Sunnyvale Calif. 94089.

Application Layer 110 and Board support Package 94

These layers include all the tasks running on top of pSOS+ 92. This includes:

Engineering analysis task 96
Application loader task 104
LED display task 100
Watchdog task 98
pSOS+/pNA+ network task 102
The MCP application task 110, consisting of the following tasks: Frame Relay Protocol Task 116, Call Manager Task 114, Management Task 120, MCP Application Main Task 118 and Command Line Interface 112.

Board Support Package 94

The Board Support Package (BSP) 94, also known as the kernel, is software that consists of the engineering analysis task, application loader task, LED display task, watchdog task, and the pSOS+/pNA+ network task. The details on these tasks are not particularly pertinent to the present invention. The kernel also contains utilities/libraries for accessing the flash file system and performing compression, and hardware drivers for serial and Ethernet ports. These utilities are accessible by the MCP application software since it is linked with the kernel's symbol table file.

The MCP application 110 of FIG. 4 will now be described in further detail in conjuction with FIG. 5. The MCP application 110 provides configuration management and call processing functionality such as setup, tear-down, and mobile dormant mode management.

The MCP application is composed of the following components:

MCP Application Main Task 118
Call Manager Task 114
Frame Relay Task/WAN interface 116
Command Line Interface 112
Network management task 120
Configuration management module 122

MCP Application Main Task 118

The MCP core kernel code 104 described earlier loads the MCP application 118 as if it were a single task. This "main" task 118 then oversees the creation of the other application "daughter" tasks (call manager, network management system, and frame relay) and handling of the watchdog timer. Once the daughter tasks have been started, this task has no active role in processing calls or data.

MCP Software Reliability Monitoring (Watchdog Timer Handling)

Once the MCP Application Main Task 118 has created the other tasks, it goes into a loop incrementing the software watchdog counter. This counter is checked periodically by a DSP-resident watchdog task 98 (FIG. 4), which runs at a higher priority than the MCP application 110. The MCP Application Main Task 118 runs at a priority lower than the other tasks; thus the fact that the MCP Application Main Task 118 can bump the software watchdog counter is an indication that the application software is not hung up somewhere. If the watchdog task 98 (FIG. 4) determines that a counter is not being. updated, it begins a series of notifications starting with warnings to the console and concluding with a board restart if the condition persists for a specified period of time. Events are also generated to the network management card 72 (FIG. 2) which result in SNMP traps being sent to the management program for the chassis.

Call Control Task 114

The Call Control Task 114 is basically a relay between the central base station controller (CBSC) in the wireless network and the MARC card. It manages a set of associations between a frame relay task (Frame Relay Switched Virtual Circuit) to the CBSC and a system bus session to the MARC card. Once a path has been established the data is simply relayed between the Frame Relay task 116 and the System Bus (SBUS) Application Program Interface (API) 130.

Dynamic Call Database 132

The Call Control Task 114 maintains a list of dynamic call database (DCD) records. A DCD record is added to the list when a connection is setup with the CBSC and deleted when a session close timer expires or any other disconnect reason (normal or abnormal). Each record contains a collection of information on a per call basis, such as access information into frame relay task for communications with the CBSC, and with the MARC card; session Ids; the Mobile IMSI/

MIN, and ESN numbers for the mobile device; the CBSC Number; a CBSC identifier for the last active packet data session; service configuration identifiers for the last active packet data session; mobility information such as the termination status of the mobile, as defined in section 6.7.1.3.2.4 of TIA/EIA/IS-95-B; Slot Cycle Index—Preferred slot cycle index of the mobile, as defined in section 6.7.1.3.2.4 of TIA/EIA/IS-95-B; the Packet Zone ID—Packet zone identifier of the CBSC that last supported an active packet data session with the mobile, as defined in section 7.7.2.3.2.13 of TIA/EIA/IS-95-B. Additional information that can be contained in the dynamic call database include the session State—Information on the status of a packet data session. The possibilities can be new data session, dormant data session, mobile initiated reactivated data session, and network initiated reactivated data session. Additional information can include:

Link Layer Status—Current status of the link layer connection. The supported values may be active and dormant.

Mobile Reactivation Status—The following parameters shall be used to monitor the status of packet data session:

Paging Status—Supported values shall be active and inactive. The default value shall be inactive.

Backoff Timer—Time to backoff before a retry on an unsuccessful attempt.

Retry Count—Number of retires attempted.

Page Response Timer—Time for the mobile to respond to a Page message.

Call Reference Value—a unique value assigned to each call.

The Dynamic Call Database records will be read-only and accessible through a set of library routines.

Call Control Module—Protocol Engine 115

The Call Control Module 115 (FIG. 5) handles call setups, tear downs, paging, and general mobile dormant mode management with the CBSC in the wireless network using the interface to the wireless network. The System Bus API 130 provides the signaling mechanism for setting up and tearing down packet data sessions (across the packet bus 56) with the MARC card 60 (FIG. 2). Once a packet data path between the CBSC and MARC card is established, the traffic is simply relayed between the two peers. The PPP Relay module 132 discussed in the next section is responsible for relaying the data.

Call Control States

In the call control module 115, each call has following major states:

IDLE
ACTIVE
DORMANT

The IDLE state represents no call or the call is down.
The ACTIVE state represents the call is up and is able to send/receive data.
The DORMANT state represents the call is up but is not able to transmit data because mobile is in sleep mode. A call needs to be reactivated before sending/receiving data over it. The MARC card buffers data that may have accumulated while dormant. When the call enters the ACTIVE state the MARC card will forward the buffered data to the MCP for transmission to the CBSC in the wireless network.

There are three sub-states of the DORMANT state:
Inactive
Paging
Paged

The Inactive state represents that the mobile is dormant with no paging to the mobile. The Paging state represents that the mobile is dormant and the IWU has sent the setup message to Base Station/Mobile Switching Center in the wireless network. The Paged state represents that the mobile is dormant and the BS/MSC has sent the paging message to mobile.

PPP Relay Module 134

The PPP relay module 134 performs the relay function. A significant performance improvement is realized by having the MCP card do the PPP framing/de-framing and CRC calculations for all PPP packets traversing the path. This feature is described in further detail in the published European patent application of Daniel L Schoo, et al., cited above. The PPP relay function can be enabled/disabled. If disabled the MARC card will perform the CRC calculation and framing/de-framing functions. The PPP offloading state in the DCD record determines whether the MCP performs this task or not.

MCP Hand-over

The MARC card 60 (FIG. 2) handles hand-overs when the mobile node moves about the wireless network such that new PPP sessions are set up between different MCP cards within the same IWU. The MCP card handles hand-overs when the mobile moves from one T1 interface to another T1 interface on the same MCP NIC card 50 (FIG. 2). When a call setup message is received from the CBSC via the Frame Relay Task 116, the Call Control Module 115 performs a database lookup in the list of dynamic call database (DCD) records stored in the Dynamic Call Database 132. The DCD records are keyed on the IMSI/ESN numbers of the mobile node. If a record is found matching the IMSI received from the mobile and the status of the call indicates that the session is dormant, the Call Control Module 115 will activate the state of the call. A path between the frame relay task 116 and the existing system bus session (which must already exist if an IMSI is found in the DCD) is then established. PPP offloading state procedures and ACCM (negotiated encoding rules for control sequences) are then reapplied to the data path. At this point the data path is opened and the PPP relay module 134 transfers new data packets as usual.

Configuration and Statistics Databases

The Configuration Database Library 122 is a set of routines for accessing and storing configuration and statistics information for the MCP card. This library's main purpose is to abstract the actual implementation of the configuration storage from the tasks that access it. A key design consideration is the ability to accept dynamic configuration changes without affecting current calls. This is accomplished by implementing the concept of working configurations and a separate master configuration. When the configuration changes, only the master configuration is changed.

The configuration database 122 will be configurable at system initialization time and at any other time during the normal operations of the MCP card. The initial system configuration can be downloaded from a management program for the chassis. If no initial configuration download file is available the MCP will boot up with default set of parameters that will allow normal operations in the MCP. The configuration database can also be modified through different mechanisms: SNMP set/get requests via the network management card, Local command line interface over RS-232 port on the MCP network interface card 50 (FIG. 2), Management program configuration files download via the network management card, and Remote CLI via Telnet passthru mode on MARC card 60.

MCP Configuration Parameters 140

Figure 5:
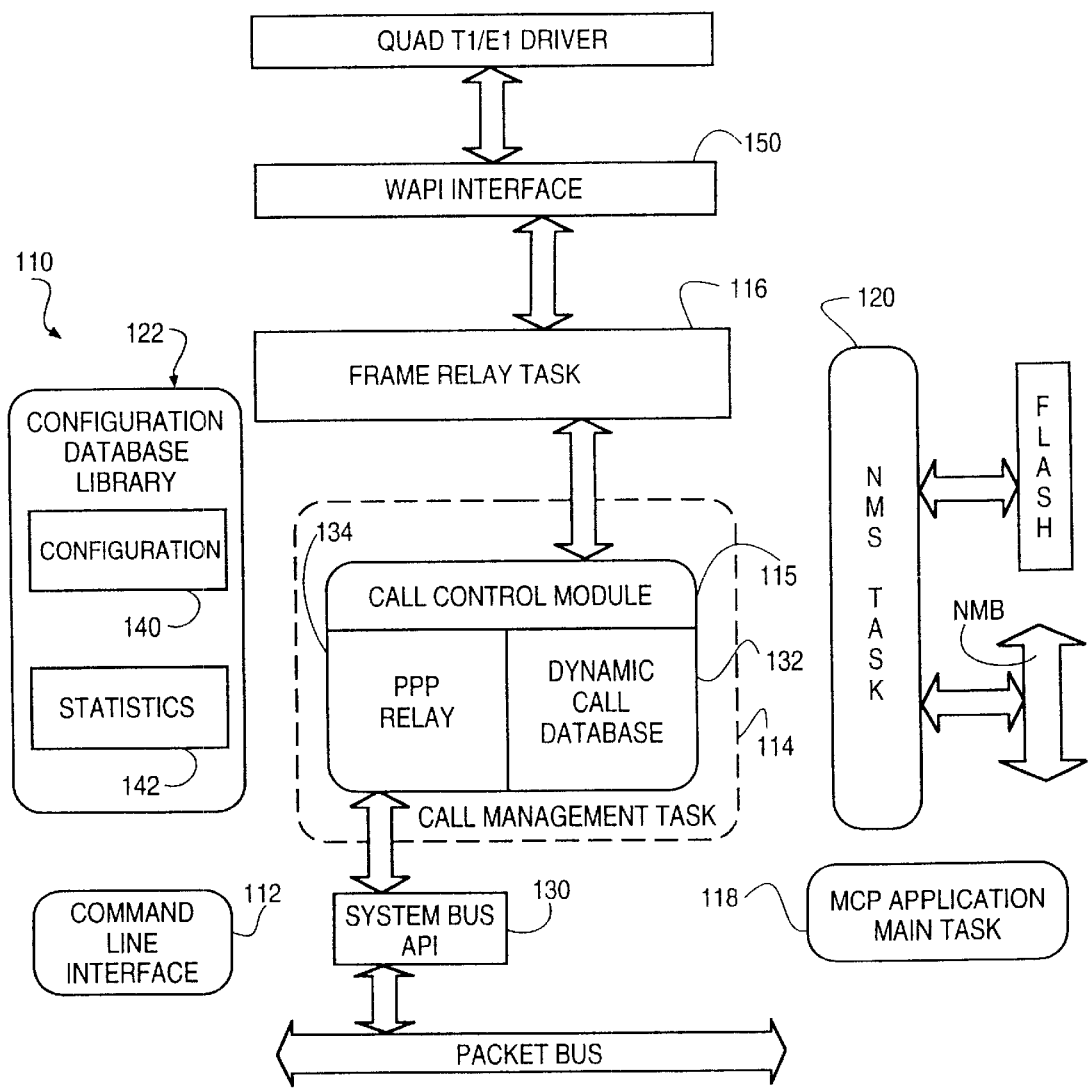
FIG. 5 is a further diagram of the software architecture for the MCP card of FIGS. 2 and 3.

The configuration parameters 140 of FIG. 5 include a set of configurable parameters, such as a list of the CBSC that are provision, including their number, and operational status.

Statistics 142

The MCP card provides statistics for performance monitoring and alarm generation. The statistics are polled by a management application periodically. Such statistics can include, for example, the number of packet bus frame overruns, packet bus CRC errors, packet bus clock losses, call control statistics, call statistics, such as the accumulated number of mobile originated calls, etc., and the CPU utilization in the MCP card.

Frame Relay Task/WAN Interface 116

The frame relay task provides the frame relay layer between the IWU and CBSC in the wireless network. Layer-2 LAPD I-frames will carry layer-3 T1.617 signaling and layer-3 data traffic.

The IWU supports single out-of-band signaling channel with independent data channels. Each call uses a single B channel for data. There will be only one switched virtual circuit per B channel. This task is also responsible for relaying the accounting information received from the MARC card to the base station and mobile switching center in the wireless network.

Layer 1

The physical layer connecting the MCP card to the wireless network is a T1 PRI with 24 DS0 channels. The first DS0 will be used for running LAPD protocol carrying layer 3 T.617 signaling over DLCI 0, which is equivalent to TEI 0 and SAPI 0. The rest of the 23 DS0 channels will be used to carry the mobile path traffic using LAPD UI frame. Each B-channel will be used to carry only one switched virtual circuit's data traffic.

Layer 2

The layer 2 LAPD I-frame will be used to carry layer 3 T1.617 signaling over SVC DLCI 0. DLCI 0 is mapped to TEI 0 and SAPI 0 in LAPD protocol. The layer 2 LAPD UI frame will be used to carry layer 3 user traffic.

Layer 3

The layer 3 protocol will be T1.617 with specific modifications:
The IWU will use and echo back Channel ID IE coming from SETUP message from CBSC.
1) End to end transit delay element will be echoed back by IWU.
2) Link layer core parameters element will be echoed back by IWU. The layer 3 messages will be carried over layer 2 LAPD DLCI 0.

WAPI Interface 150

The Wide area network Application Programming Interface (WAPI) is a custom interface for the Quad T1/E1 Network Inface Card 50 (FIG. 2) driver software. It provides a robust programming interface for allocating and managing resources on the Quad T1/E1 NIC card 50.

The WAPI 150 externalizes a set of functions that are accessible through the MCPs configuration library 122. All four facilities on the NIC card 50 can be configured through the configuration library. Each facility can be configured to support different signaling methods including: out-of-band signaling and in-band signaling, and support for fractional T1.

Support for enabling/disabling of resources at a facility and DS0 level is also provided. This can be initiated by the system administrator or by an event occurring in the system indicating a hardware failure.

Features of the MARC Card 60 Software (FIG. 2)

In the illustrated embodiment, the MARC card 60 application is a derivative of the existing software present on the HiperARC router or gateway card of the Total Control Enterprise Network Hub of 3Com Corporation. The MARC card terminates the PPP connections to the mobile station. From the MARC card point of view the MCP cards look like ordinary modems, providing dial-in services. The difference is that the MCP can drop the connection to the mobile and leave the system bus connection over the packet bus to the MARC card established. The system bus session is torn down when any of the following events occur: the MARC receives a session-close timer event from the MCP, the RADIUS client receives a resource-reclaim request from RADIUS server, the MARC card receives a system bus connection request for a mobile that already has an SBUS connection established, or if certain error conditions are present.

Hand-over

The MARC card supports hand-overs by suspending existing system bus connections to MCP cards. A suspended system bus connection means that the connection to the MCP as well as the PPP context associated with it is left open. The connection is kept up until the MCP signals the MARC card to drop it. This can happen in four ways, excluding error conditions:
1) The MCP card session-close timer expires
2) The mobile station application drops its PPP connection
3) an intra-IWU hand-over (hand-over between MCP card) occurs; or
4) an inter-IWU hand-over occurs with the RADIUS server sending a resource-reclaim request to the MARC card.
Hand-overs within an MCP are handle locally by that MCP card (i.e. the MCP will use the same system bus connection it had when the mobile went dormant).

The session-close timer in Internet and Intranet services is the maximum time a mobile can remain in the dormant state. When the timer pops the MCP signals the MARC card resulting in the PPP session being terminated and the system bus connection being released. All resources associated with the connection are reclaimed. The call is released.

The second case is PPP connection dropping. The entire call is removed from existence. The call is released.

In the third case the MCP will signal the MARC that a new call is pending. The MARC card will search its database of IMSIs to determine if a system bus/PPP session already exists for this mobile. If it does the old system bus connection is dropped and a new one is established with the MCP. The existing PPP context or "state" is transferred to the new SBUS connection and PPP traffic flows as if nothing ever happened. This process is described in further detail previously.

In the fourth case a mobile went dormant and then "awoke" at another IWU (i.e., at another MARC card in the chassis or in a different chassis). The RADIUS server will receive an access-request message from the new MARC card. If the RADIUS server determines that the mobile already has authenticated at another MARC, the RADIUS server will send a resource-reclaim to the old MARC and then send an access-accept to the new MARC. This tears down the PPP connection on the old MARC card and establishes a new PPP session from the new MARC card to the mobile. The RADIUS server ensures that the same IP address is assigned to the mobile after moving from one MARC card to another.

IMSI Database

As mentioned above the MARC card must maintain a database of records to support hand-overs between MCP cards. Each record will contain the following: IMSI/ESN numbers, System bus session ID, Usemame and IP address assigned to calling entity.

RADIUS Client

The MARC Card implements a RADIUS client application which will support the standard RADIUS features set forth in Request for Comments (RFC) 2058 and 2059, as well as resource management and interim accounting messaging that includes:

Resource-Query-Request
Resource-Query-Response
Resource-Reclaim-Request
Resource-Reclaim-Response
Nas-Reboot-Request
Interim-Accounting

RADIUS Accounting

All RADIUS accounting is done through the MARC card RADIUS client application. The MARC may require additional accounting message attributes. The exact set of accounting attributes is highly dependent on how billing is done by the wireless service providers, such as whether dormant billing is being performed. The following attributes may be added to the MARC card RADIUS client application:

Active Session (which means the mobile has an active air traffic channel)
Active Session Start Time
Active Session End Time
Active Session Direction (i.e. mobile-originated or mobile terminated)
Active Session Received Byte Count
Active Session Transmitted Byte Count

Interim Accounting

Accounting is started when a new connection is established and stopped when the connection is released. These two messages delimit the entire accounting session. Interim accounting messages are sent on a periodic basis. The MARC card will send the messages every 'X' minutes and the RADIUS server will translate these into start and stop messages.

IWU—Wide Area Push (WAP) Service Support

The IWU architecture of FIGS. 1 and 2 can be used to support a feature by which a terminal on the IP network can initiate a paging of the wireless terminal via the IWU and thereby initiate a communications session with the wireless terminal, without having to have the wireless device be previously registered with the wireless network. In order to support non-registered mobile push services, each service provider will designate one of the deployed IWUs as a master. The master IWU MARC card will sniff all Adresss Resolution Protocol (ARP) requests it receives over the IP network. If the entry is found processing continues as usual. If no entry is found the MARC will send an access-request to the RADIUS server with the username set to IP-Address@domain, where "IP-Address" is the address being sniffed and "domain" is the domain of the WAP Home RADIUS server. The domain is a new configurable parameter set in the master IWU only. The home RADIUS server will return the IMSI and ESN in the call-id and call-number attributes of the access-accept packet. This information is sent to the MCP, which then pages the mobile device via the wireless network.

When the device receives the page, it then knows that a terminal on the IP network is trying to reach it. When the device responds to the page, a connection through the wireless network, an IWU and packet-switched network is initiated. Typically the connection will go through one of the other network access servers on the LAN. The network access server receiving the incoming call from the wireless device notifies a mobile node location server that it has the call (e.g., by an ARP message), providing it with the IP address for the mobile node, and this information is placed in the mapping table maintained by the mobile node location server. The new IP address is forwarded to the home agent to enable the packet from the remote terminal to be routed to the network access server receiving the response to the page. At this point the communication between the wireless device and the terminal on the network may be initiated. The above process is described in further detail in the patent application of Richard Dynarski, filed concurrently, Ser. No. 09/233,381, which is incorporated by reference herein.

Persons skilled in the art will appreciate that numerous modifications may be made to the disclosed embodiments without departure from the spirit and scope of the invention. This true scope and spirit is to found be reference to the appended claims, interpreted in light of the foregoing.

We claim:

1. A method of connecting a communications device to a packet switched network, comprising the steps of:

initiating a Point-to-Point Protocol (PPP) session between said device and a network access server, said network access server providing access to said packet switched network for said device, said session associated with a PPP state and with a first port in said network access server, wherein said PPP session thereafter becomes dormant but said PPP state is not removed from said network access server;

receiving, after said PPP session has become dormant, at said network access server a new call set-up message associated with said device, said new call set-up message arriving at a second port in said network access server;

switching said PPP state from said dormant PPP session associated with said first port to a session associated with said new call set-up message associated with said device at said second port, wherein said PPP state is transferred to said session associated with said new call set-up message and the negotiation of link control protocols or network control protocols between said device and said network access server may be avoided.

2. The method of claim 1, wherein said PPP session becomes dormant due to movement of said device relative to a first radio tower linking said device to a wireless communications network, and wherein said new call set-up message is initiated in response to said device coming within range of a second radio tower in said wireless communications network.

3. The method of claim 1, wherein said new call set-up message contains information uniquely identifying said device, and wherein the method further comprises the steps of:

transmitting an access-request message containing said information from said network access server to an authorization server;

said authorization server responsively issuing an access-accept message to said network access server; and said network access server using said information to identify and find said dormant PPP session associated with said first port in said network access server.

4. A method of connecting a communications device to a packet switched network, comprising the steps of:

initiating a Point-to-Point Protocol (PPP) session between said device and a first network access server, said first network access server providing access to said packet switched network for said device, said session associated with a PPP state and with a first port in said first network access server, wherein said PPP session thereafter becomes dormant but said PPP state is not removed from said network access server;

receiving, after said PPP session has become dormant, at a second network access server a new call set-up message containing information uniquely associated with said device, said new call set-up message arriving at a first port in said second network access server;

transmitting an access-request message from said second network access server to a authentication server, said access-request message containing said information uniquely identifying said device;

said authorization server responsively issuing a message to said first network access server to initiate clearing of said dormant session from said first network access server; and said authorization server further issuing an access-accept message to said second network access server, said access-accept messaging containing information as to said PPP state retrieved from said first network access server, said second network access server responsively configuring a new PPP session with said device with variables from said dormant PPP session.

5. The method of claim 4, wherein said PPP session becomes dormant due to movement of said device relative to a first radio tower linking said device to a wireless communications network, and wherein said new call set-up message is initiated in response to said device coming within range of a second radio tower in said wireless communications network.

6. In a wireless communications system comprising a plurality of radio towers transmitting and receiving data to and from a plurality of mobile wireless communications devices, a plurality of base stations linking said radio towers to a high speed digital network, and at least one network access server coupled to said high speed digital network, said network access server providing access for said devices to a packet switched network, an improvement comprising;

an authentication server coupled to said network access server over a local or wide area network, said authentication server:

(a) processing an access-request message from said network access server when a mobile wireless communications device among said plurality of mobile wireless communications devices moves out of range from a first radio tower amongst said plurality of radio towers and into range of a second radio tower amongst said plurality of towers, said access-request messages containing information uniquely identifying said device;

(b) determining, from said information, whether an Internet Protocol (IP) address has been allocated to said device, and (c) responsively issuing to said network access server an access-accept message containing said information in the event that an IP address has been allocated to said device, wherein said network access server may use said information to find a dormant PPP session associated with a communication between said network access server and said device via said first radio tower amongst said plurality of towers and switch a PPP state associated with said dormant PPP session to a session associated with said access-request message;

whereby said PPP state may be transferred to said session associated with said access-request message and the negotiation of link control protocols or network control protocols between said device and said network access server may be avoided.

7. The method of claim 1, further comprising:

tracking dormant time periods in which said PPP session associated with said first port and a PPP session associated with said new call set-up message are dormant;

allocating a cost for said dormant time periods;

tracking active time periods in which said PPP session associated with said first port and said PPP session associated with said new call set-up message are active;

allocating a cost for said active time periods; and billing a user operating said communications device for said dormant time periods and said active time periods.

8. The method of claim 7, wherein tracking dormant time periods comprises:

sending periodic update messages from said network access server to an accounting server, wherein said update messages include information uniquely identifying said communications device and information indicating a status of a respective dormant PPP session.

9. The method of claim 7, wherein said network access server is coupled to said accounting server via a local area network.

10. The method of claim 7, wherein said accounting server comprises a RADIUS server.

11. The method of claim 7, wherein the packet switched network comprises an Internet.

* * * * *

UNITED STATES PATENT AND TRADEMARK OFFICE
CERTIFICATE OF CORRECTION

PATENT NO.    : 6,628,671 B1
DATED         : September 30, 2003
INVENTOR(S)   : Richard J. Dynarski et al.

It is certified that error appears in the above-identified patent and that said Letters Patent is hereby corrected as shown below:

<u>Title page,</u>
Item [73], Assignee, please delete "VTStarcom, Inc." and substitute -- UTStarcom, Inc. --.

Signed and Sealed this

Twenty-fifth Day of May, 2004

JON W. DUDAS
*Acting Director of the United States Patent and Trademark Office*